3,104,270
HYDROCARBON POLYMERIZATION CATALYST
William Judson Mattox and Charles Newton Kimberlin, Jr., Baton Rouge, La., assignors to Esso Research and Engineering Company, a corporation of Delaware
No Drawing. Filed Aug. 6, 1957, Ser. No. 676,474
7 Claims. (Cl. 260—683.15)

The present invention is concerned with a process for the preparation and use of improved polymerization catalysts. It more specifically relates to the preparation of improved catalysts for polymerizing low molecular weight hydrocarbons. In accordance with the present invention, an improved silica and alumina-comprising catalyst is employed to polymerize low molecular weight olefins to valuable products, particularly to hydrocarbons boiling in the motor fuel range.

It has in the past been suggested to treat hydrocarbon olefinic materials with silica and alumina-comprising materials. Thus, the silica-alumina gel cracking catalysts have long been familiar, and the use of zeolites to treat hydrocarbons is also known. The prior art compositions have been amorphous, and have pore openings covering a wide range of diameters, from less than 5 angstroms to 200 angstroms and higher. Such materials, though active as cracking catalysts, have decided drawbacks when used as polymerization catalysts. Amorphous zeolites do not show selective polymerization to low molecular weight hydrocarbons, and this may be related to the non-uniformity of the pore opening.

A catalyst has now been discovered that shows high activity and selectivity to polymerizing normally gaseous and low boiling liquid olefins, such as propylene, ethylene, the butylenes and amylenes and higher olefins to comparatively low molecular weight hydrocarbons boiling in the naphtha and motor fuel boiling range, i.e. from $C_5$—400° F. This catalyst has a highly ordered crystalline structure characterized by having pores of nearly uniform dimensions, in the range of 6 to 15 angstroms. This catalyst comprises an alumino-silicate anionic cage structure in which the alumina and silica tetrahedra are intimately connected to each other. Hydrogen or various metal cations are distributed throughout the structure to maintain electrical neutrality. The dispersion of the silica and alumina tetrahedra is highly ordered, thereby making for maximum number of active sites caused by the condensation of SiOH and AlOH groups. The uniform pore openings in the range of about 6 to 15 angstroms allow for easy ingress of all hydrocarbon feed types and egress of the reaction products. This serves to lower catalytic coke buildup within the structure and improve regeneration characteristics of the catalyst.

The catalyst of the invention, as mentioned above, is a crystalline alumino-silicate and can be base exchanged with numerous metal or hydrogen cations. In this regard it resembles a zeolite, some of which are known to possess activity as cracking catalysts. However, the catalyst of the invention may be distinguished over the zeolite art by the nearly uniform pore openings.

In accordance with the present invention, there is employed as a hydrocarbon polymerization catalyst a metal salt of a crystalline alumino-silicate having pore openings adequate to admit freely the individual molecules to be converted. The pore openings will therefore be about 6 to 15 angstroms. Random size openings are not satisfactory when they cover a wide range for the reasons mentioned above.

Alumino-silicates of high conversion activity may be prepared by mixing and heating sodium aluminate and sodium silicate, preferably sodium metasilicate, under carefully controlled conditions of temperatures, concentrations, and alkalinity, to produce a crystalline product which is subsequently dehydrated under conditions to preserve the crystalline structure. If desired, the sodium content of the alumino-silicate may thereafter be replaced at least in part by effecting ion exchange with an appropriate metal salt, such as magnesium. The base exchange, however, is not necessary.

The preparation of the catalyst involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 angstroms.

The ratio of $Na_2O/SiO_2$ in the silicate employed must be at least 0.5/1, but may be as high as 2/1. Preferably, the ratio is 0.7/1 to 1/1, and the desired reagent is sodium metasilicate. If water glass is employed, additional caustic must be present.

The composition of the sodium aluminate is less critical. Sodium aluminates having any ratio of soda to alumina in the range of 1/1 to 3/1 may be employed; however, a sodium aluminate having a high ratio of soda to alumina is preferred, and a sodium aluminate having the ratio of about 1.5/1 $Na_2O/Al_2O_3$ is particularly desirable. The amounts of sodium silicate solution and sodium aluminate solutions are such that the mol ratio of silica to alumina in the final mixture is at least 2.2/1, and preferably 2.5–4/1. However, silica to alumina ratios as high as 10/1 may be employed.

The method of mixing the sodium metasilicate and sodium aluminate solutions must be carried out in a manner allowing the formations of a precipitate having a uniform composition. A good method is to add the aluminate to the silicate at ambient temperatures using rapid and efficient agitation to make a homogeneous paste. Thereafter, the mixture is heated to about 180° to 215° F. for a period up to 200 hours or more to ensure crystallization in the form having interstices large enough to adsorb isoparaffinic and aromatic molecules. The heat-soaking step is essential; however, heating at temperatures of about 350° F. and higher does not produce a crystalline composition having the desired uniform size pore openings.

A general scheme for preparing the hydrocarbon conversion catalyst is as follows: A solution of sodium metasilicate is prepared, having a concentration of 30 to 300 grams, preferably 100 to 200 grams/liter. Similarly, a solution of sodium aluminate having an $Al_2O_3$ concentration of 40 to 400 grams, preferably 200 to 300 grams, is prepared. The amounts of metasilicate and aluminate solutions employed are such that the ratio of $SiO_2/Al_2O_3$ in the final mixture is 2.2/1 to 10/1, preferably 2.5/1 to 4/1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

If desired, the crystalline product resulting from the heat-treating step may be reacted with the salt of a metal of the type previously enumerated, though the sodium form itself may be employed. In the latter case, the crystalline material is water-washed, filtered, and heat activated by calcination at 400° to 1000° F., preferably about 700° to 900° F. The crystalline sodium alumino-silicate formed during the heat soaking period has the stoichiometric composition of $Na_2O.Al_2O_3.2.7SiO_2$. The sodium crystals may be exchanged with hydrogen or reacted with metal salt solutions that enhance the catalytic behavior under certain circumstances. These metals are of the type already enumerated, and may further include cobalt, nickel, copper, calcium, magnesium, chromium, iron, silver, gold, platinum, zinc, cadmium, rare earths, mercury, lead and the like.

By modifying the conditions of synthesis, it is possible to obtain crystals having pores between about 3 and 5 angstroms diameter. Other metal forms of this crystalline sodium alumino-silicate may be prepared in a manner identical with the above 6 to 15 A. pore diameter crystal. However, the 3 to 5 A. pore diameter crystals will not allow any but straight chain paraffins and olefins to enter or leave the interior of the pores which present the active catalyst sites. Thus, polymerization reaction induced by the catalyst form a product that is too large to leave the pores. This leads to rapid deactivation of this material, and eventual coking.

The process of the present invention will be more readily understood by reference to the following examples illustrating the same.

Example 1

A crystalline sodium alumino-silicate having pore openings of about 4 Angstroms was prepared as follows: Four liters of water are heated to near boiling. A separate vessel contained 6 kg. of a solution comprising 1176 grams sodium metasilicate ($Na_2O.SiO_2$). A third vessel contained 1970 cc. of a sodium aluminate solution comprising 20% $Al_2O_3$ and 1.5 mols $Na_2O$ per mol $Al_2O_3$. The hot water was rapidly stirred and the silicate and aluminate solutions were added simultaneously through separate lines to the vessel initially containing the water. The temperature was kept at 210° to 215° F. for a total of 50 minutes. The slurry was filtered and washed well with water. A chemical analysis showed it to have the relative stoichiometric composition of $Na_2O.Al_2O_3.2SiO_2$. This material was heat activated for four hours at 850° F. It had pore openings large enough to admit ethane, but it displayed no adsorptive capacity for n-heptane. It is designated as catalyst "A" in succeeding examples.

Example 2

A portion of catalyst "A," prior to heat treatment, was slurried with a solution of calcium chloride, filtered, water washed, and heated for four hours at 850° F. This crystalline material, having a molecular composition of $(0.28)Na_2O.(0.71)CaO.Al_2O_3.(2)SiO_2$ had an adsorptive capacity for n-heptane of 0.19 cc./gram. Its pore opening was 5 Angstrom units, and is designated as catalyst "B."

Example 3

A crystalline sodium alumino-silicate having a uniform pore opening of about 13 angstroms was prepared as follows: Forty-three hundred and fifty grams of sodium metasilicate ($Na_2O.SiO_2.5H_2O$) are dissolved in 13 liters $H_2O$ at room temperature. Using rapid stirring, 2650 grams of a sodium aluminate solution (20% $Al_2O_3$ and 1.5 $Na_2O.Al_2O_3$ molar composition) are added to facilitate solution. An additional 10 liters $H_2O$ are added to facilitate stirring. The composite slurry is heated to 180° to 210° F., and maintained at these temperatures for 240 hours. The slurry is cooled, filtered, and washed well with water. After oven drying at 250° F. and calcining for four hours at 850° F., the material was analyzed and showed the relative stoichiometric composition of $Na_2O.Al_2O_3.2.7SiO_2$. The product had an adsorptive capacity for n-heptane and toluene of about 0.20 cc./gram. This is catalyst "C."

Example 4

A typical synthetic zeolite "Decalso" comprises a plural gel, containing three components, viz. $Na_2O$, $Al_2O_3$, and $SiO_2$. To determine the polymerizing properties of this zeolite, a portion of this sodium aluminum silicate was dried, ground, sized, and activated at 850° F. This product is catalyst "D."

Polymerizing conditions with the catalyst of the present invention comprise temperatures of from about 300° to 650° F. and pressures of from atmospheric to 1000 p.s.i. or higher, but preferably about 100 to 500 p.s.i. In Example 5 below, propylene is polymerized with the catalysts set forth above, and also with the commercial phosphoric acid on kieselguhr, or "U.O.P." catalyst. The latter is probably the most widely used propylene polymerization catalyst.

Example 5

PROPYLENE POLYMERIZATION

| Catalyst | A | B | C | C | D | UOP | |
|---|---|---|---|---|---|---|---|
| | Alumino-Silicate | | | | Sodium Alumino Silicate "Decalso" | Phosphoric acid | |
| | 4A Sodium Form | 5A Calcium Form | 13A Sodium Form | | | Pilot Unit | Comm. Unit |
| Temp., °F | 550 | 550 | 500 | 550 | 550 | 500 | 350–420 |
| Pressure, p.s.i.g | 125 | 125 | 125 | 125 | 125 | 125 | 1,000 |
| Feed Rate, W./Hr./W | 0.2 | 0.2 | 0.2 | 0.2 | 0.2 | 0.2 | |
| Propylene Conversion, Percent | 0 | <10 | 40 | 50 | 0 | >90 | >90 |
| Polymer Inspection: | | | | | | | |
| C₅–265° F. Cut— | | | | | | | |
| Vol. Percent of Total Polymer | | | 59 | 66 | | 54 | 32 |
| Res. Oct. No | | | | 95.6 | | | 96.0 |
| Bromine No | | | | 158 | | | |
| C₅–400° F. Cut— | | | | | | | |
| Vol. Percent of Total Polymer | | | 95.3 | | | 83.7 | |
| Res. Oct. No | | | 91.0 | | | 91.4 | |
| Bromine No | | | 143 | 144 | | 114 | |
| Gravity, °API | | | 63.4 | | | 65.5 | |

Catalyst "A," having pore openings of about 4 angstroms, was inactive and produced no polymer. Catalyst "B" with pore openings of 5 angstroms, was of low activity and showed less than 10% $C_3H_6$ conversion. Catalyst "D," a porous but amorphous sodium aluminosilicate, was completely inactive. In contrast to these catalysts, the sodium alumino-silicate having pore openings of about 13 angstroms (catalyst "C") was quite active at temperatures of 500° and 550° F. for production of light polymer. These reaction temperatures are higher than those suitable for most polymerization catalysts and favor increased yields of high octane, light polymer. Such polymers are highly desirable products particularly useful for improving the volatility and octane number of the lower boiling fractions of motor fuels. These polymers are also useful as olefinic intermediates in chemicals manufacture, such as in the manufacture of oxo alcohols.

The polymer produced with 13 A type alumino-silicate at 550° F. contained about twice the percentage of $C_6$ and $C_7$ found in commercial phosphoric acid polymer. Polymerization of propylene over phosphoric acid catalyst in the laboratory unit at 500° F., which is a temperature above that found optimum in commercial operations, gave a yield of light polymer approaching that obtained with the alumino-silicate at the same temperature. However, the phosphoric acid catalyst would not be suitable for prolonged or continuous use at the temperatures necessary for the improved yields of light polymer due to dehydration and the resulting degradation of the catalyst. Furthermore, this catalyst is not regenerable and must be replaced when deactivated. In contrast to the performance of this catalyst, the alumino-silicate does not require hydration to maintain activity, produces little if any coke-like materials at the desired level of operating temperatures and even under such drastic conditions as do deposit objectionable deposits of coke, the catalyst is readily regenerable by air blowing without removal from the reactor.

*Example 6*

A $C_{10}$ hydrocarbon mixture containing 25% of $C_{10}$ olefin was passed in the vapor phase through a catalyst "C" bed at 400° F. and atmospheric pressure. The polymer formed was adsorbed on the catalyst and was recovered by desorption with steam at the same temperature. The polymer yield amounted to 68 volume percent of the olefin fed.

An important advantage of the polymerization catalyst of the present invention is the ease of regenerability. Carbon and high polymers may readily be burned off and the catalyst restored to its initial activity. Thus the catalyst may be employed at elevated temperatures without detriment. However, conventional polymerization catalysts, such as the commercial $P_2O_5$-kieselguhr catalyst, may safely be used only at relatively low temperatures of about 350° to 450° F. At 500° F. and higher, it readily dehydrates and carbonizes, degrading the catalyst. Restoring this catalyst is a considerably more costly and impractical project so that once deactivated it is usually discarded.

The process of the present invention is not only useful in preparing high octane, high volatility motor fuels, but also in furnishing chemical intermediates for various processes such as the oxo process wherein olefins are required.

What is claimed is:

1. An improved process for polymerizing gaseous and low boiling normally liquid monoolefins to produce hydrocarbons boiling in the naphtha and motor fuel boiling ranges which comprises contacting said olefins at a temperature of from about 300° to 650° F. with a crystalline metallic alumino-silicate catalyst having uniform pore openings of about 6 to 15 Angstrom units.

2. An improved process for preparing high octane motor fuels which comprises passing a monoolefinic hydrocarbon stream having from 2 to 6 carbon atoms into a polymerization zone, contacting said stream in the vapor phase at 500° to 650° F. and 100 to 500 p.s.i.g. with a crystalline alumino-silicate catalyst having uniform pore openings of between 10 to 13 Angstrom units, and recovering good yields of high octane fuel.

3. The process of claim 2 wherein said catalyst has an empirical formula corresponding to

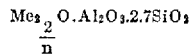

where Me is a metal and $n$ is its valence.

4. The process of claim 3 wherein said catalyst has the formula $Na_2O.Al_2O_3.2.7SiO_2$.

5. The process of claim 3 wherein said metal is an alkaline earth metal.

6. The process of claim 2 wherein said stream is rich in propylene.

7. An improved process for polymerizing low boiling monoolefins to produce hydrocarbons boiling in the naphtha and motor fuel boiling ranges which comprises contacting said olefins at a temperature of from about 300° to 500° F. with a crystalline metallic aluminosilicate catalyst having uniform pore openings of about 10 to 13 Angstrom units.

References Cited in the file of this patent

UNITED STATES PATENTS

| | | |
|---|---|---|
| 1,728,732 | Jaeger | Sept. 17, 1929 |
| 2,137,492 | Hyman | Nov. 22, 1938 |
| 2,273,038 | Houdry et al. | Feb. 17, 1942 |

UNITED STATES PATENT OFFICE
CERTIFICATE OF CORRECTION

Patent No. 3,104,270                                September 17, 1963

William Judson Mattox et al.

It is hereby certified that error appears in the above numbered patent requiring correction and that the said Letters Patent should read as corrected below.

Column 6, lines 30 to 32, the formula should appear as shown below instead of as in the patent:

$$Me_{\frac{2}{n}}O \cdot Al_2O_3 \cdot 2.7SiO_2$$

Signed and sealed this 7th day of December 1965.

(SEAL)
Attest:

ERNEST W. SWIDER
Attesting Officer

EDWARD J. BRENNER
Commissioner of Patents